United States Patent
Chen et al.

(10) Patent No.: US 6,493,762 B1
(45) Date of Patent: *Dec. 10, 2002

(54) INDEX ALLOCATION FOR DATA BROADCASTING

(75) Inventors: Ming-Syan Chen, Yorktown Heights, NY (US); Kun-Lung Wu, Yorktown Heights, NY (US); Philip Shi-Lung Yu, Chappaqua, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/436,689

(22) Filed: May 8, 1995

(51) Int. Cl.[7] .......................... G06F 15/16; G06F 17/30
(52) U.S. Cl. ...................... 709/231; 455/3.01
(58) Field of Search ...................... 380/9, 29; 370/94.1; 340/825.44; 348/7, 8; 395/613; 709/230, 231, 238, 240, 245; 455/3.01, 3.02, 3.03, 3.04, 405, 422, 434; 707/2, 3, 100, 101, 104.1

(56) References Cited

U.S. PATENT DOCUMENTS

| | | | | |
|---|---|---|---|---|
| 4,467,411 A | * | 8/1984 | Fry et al. .................... | 395/250 |
| 5,204,958 A | * | 4/1993 | Cheng et al. ............... | 395/613 |
| 5,479,657 A | * | 12/1995 | Toyonaga et al. ........... | 395/600 |

FOREIGN PATENT DOCUMENTS

JP        63-239540    *   5/1988

OTHER PUBLICATIONS

Gidlow A.C. "Data Services on PCN," IEEE Collq (1995).*
Berman et al. "Information/Communication and Dispatching Strategies for Networks with Mobile Servers," IEEE Transactions on System, Man and Cybernetics, Jan. 1990.*

* cited by examiner

Primary Examiner—Dung C. Dinh
(74) Attorney, Agent, or Firm—Gail H. Zarick (57) ABSTRACT

A system and method for broadcasting data in accordance with predicted usage. In accordance with the method, the predicted usage of data records within a given set is determined. The broacast order is then determined based on the predicted usage and the data records are broadcast in the order determined. Two kinds of embodiments are considered: one in which variant index fanouts are not allowed (i.e., fixed fanout has to be used), and the other in which variant index fanouts are allowed. For the case of fixed index fanouts, a first method for the optimal index tree construction minimizes the average cost of index probes. For the case of variant index fanouts, a second method (method 2) builds index trees with variant fanouts. The first method uses access frequencies of data records to build a fixed fanout index tree. In the second method, the number of fanouts of each index is determined as a function of the access frequencies of those nodes (data or indexes) that the index node points to.

14 Claims, 11 Drawing Sheets

| DATA RECORD | R1 | R2 | R3 | R4 | R5 | R6 | R7 | R8 | R9 |
|---|---|---|---|---|---|---|---|---|---|
| $Pr\{R_i\}$ | .4 | .4 | .05 | .05 | .05 | .02 | .02 | .02 | .02 |

FIG. 10

| DATA RECORD | R1 | R2 | R3 | R4 | R5 | R6 | R7 | R8 | R9 | R10 | R11 |
|---|---|---|---|---|---|---|---|---|---|---|---|
| $Pr\{R_i\}$ | .28 | .2 | .2 | .2 | .04 | .04 | .02 | .005 | .005 | .005 | .005 |

INDEX ALLOCATION FOR DATA BROADCASTING

I. BACKGROUND OF THE INVENTION

1. Field of the Invention

The present invention relates to broadcasting data in a wireless mobile computing environment.

2. Related Art

Mobile computing, referring to the activity of using personal digital assistants, such as palmtops and notebook computers, to access a large number of databases via wireless networks, is an emerging technology. A significant amount of research effort has been directed towards exploring various aspects of mobile computing, such as energy saving, cache management, query processing and data allocation. Applications such as using palmtops to access airline schedules, stock activities, traffic conditions and weather information on the road are expected to become increasingly popular. It is noted, however, that several mobile computers, such as desktops and palmtops, use small batteries for their operations and are not directly connected to any power source. As a result, energy saving is a key issue to resolve before one can anticipate an even wider acceptance of mobile computers.

In general, a mobile server is expected to concurrently serve hundreds or even thousands of clients. In large part, because the cost of broadcasting is independent of the number of users, periodic broadcasting is the prevalent method for information dissemination in a wireless communication environment. When a palmtop is actively listening to a channel, its CPU is in an active mode to examine data packets so as to determine if they match the predefined patterns. Such CPU operations for data examination consume much more power than those for simply receiving data. Therefore, to achieve energy savings it is highly desirable to let the palmtop stay in the doze mode most of the time and only enter the active mode when it is necessary. As a consequence, it is advantageous to use indexed data organization to broadcast data over wireless channels so that those mobile units can be guided to the data of interest efficiently and only need to be actively listening to the broadcasting channel when the relevant information (indexes or data) is present. The structure of an index tree determines the index probing scenario for data access under such an indexed broadcasting.

Figure 1A:
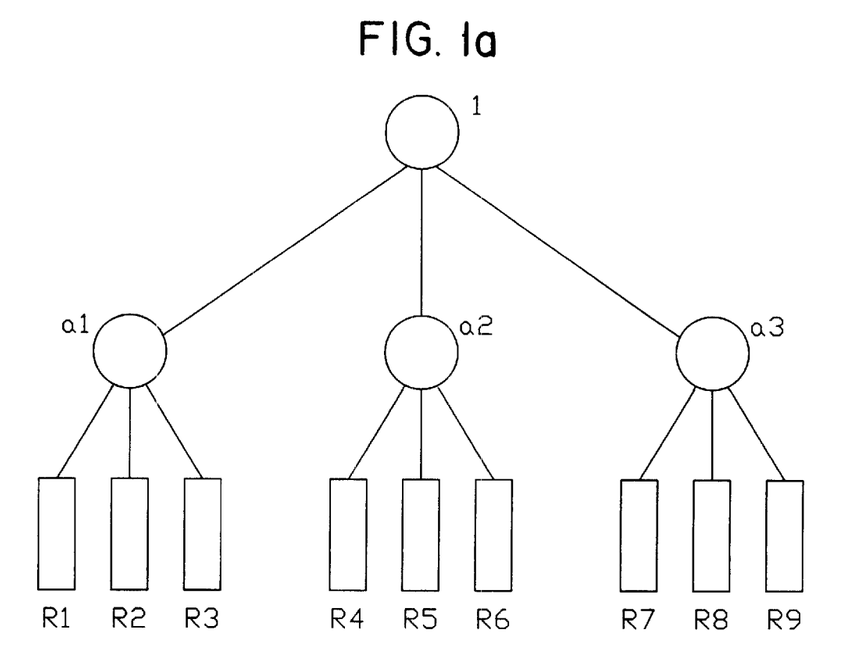
FIG. 1a is an illustration of the conventional index tree for use in broadcasting by a mobil server.
Figure 1B:
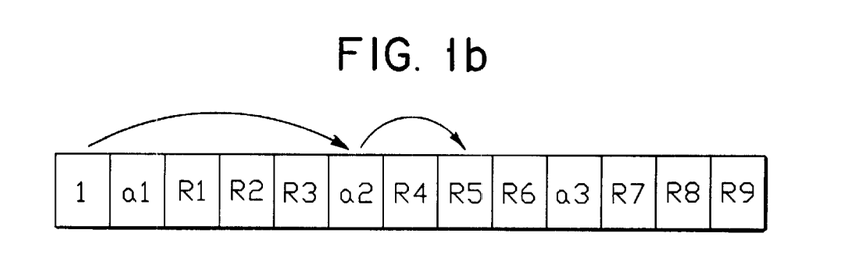
FIG. 1b shows a conventional index probing scenario.

A conventional index tree is given in FIG. 1a, and its corresponding broadcasting sequence is shown in FIG. 1b. Suppose that record R5 is the record to be accessed. Then, after being routed to the root index, I, the request will probe I and $a_2$, and then reach R5. Clearly, using this index tree, a request to any record will take two index probes. Note that the number of index probes is proportional to the amount of time that a mobile unit has to stay in the active mode.

Typically, conventional wireless servers provide a symmetric balanced index tree with essentially the same fanouts for all index nodes. One possible reason for this is that in a conventional file system (one that is not used in conjunction with wireless mobile computing) the cost of executing an index probe for data access is almost negligible as compared to other CPU and I/O operations. Thus little overall performance improvement is obtained by minimizing the number of index probes. Such a cost model, however, does not hold in the context of wireless mobile computing, in which the cost for a mobile unit to listen to the indexed broadcasting message is one of the major sources for power consumption. Hence, reducing the average number of index probes will result in a lower power consumption.

It is noted that in most databases the access frequencies of different data records are usually different from one another. This phenomenon is termed data access skew.

II. SUMMARY OF THE INVENTION

In light of the above, the present invention provides a system and method for broadcasting data in accordance with predicted usage. In accordance with the method, the predicted usage of data records within a given set is determined. The broacast order is then determined based on the predicted usage and the data records are broadcast in the order determined.

In the preferred embodiments, two kinds of systems are considered: one in which variant index fanouts are not allowed (i.e., fixed fanout has to be used), and the other in which variant index fanouts are allowed. For the case of fixed index fanouts, a first method (method 1) for the optimal index tree construction that minimizes the average cost of index probes is provided. For the case of variant index fanouts, a second method (method 2) for building index trees with variant fanouts is provided.

The first method uses access frequencies of data records to build a fixed fanout index tree. Exploiting data access skew, the index tree built by the method could be imbalanced. Thus, in cases where variant fanouts are allowed the second method is preferred. In the second method, the number of fanouts of each index is determined as a function of the access frequencies of those nodes (data or indexes) that the index node points to.

After an index tree is built, the mobile unit can locate the data of interest, according to the index tree, with the minimal probing cost. It is noted that the average cost of index probes can be significantly reduced not only by employing an imbalanced index tree that is designed in accordance with data access skew, but also by exploiting variant fanouts for index nodes.

These, and other features and advantages of this invention will become apparent from the following detailed description of the invention taken in conjunction with the accompanying drawings.

III. BRIEF DESCRIPTION OF THE DRAWINGS

FIG. 4b shows a data broadcasting sequence corresponding to the index tree of FIG. 4a.

IV. DETAILED DESCRIPTION OF A PREFERRED EMBODIMENT

Figure 2:
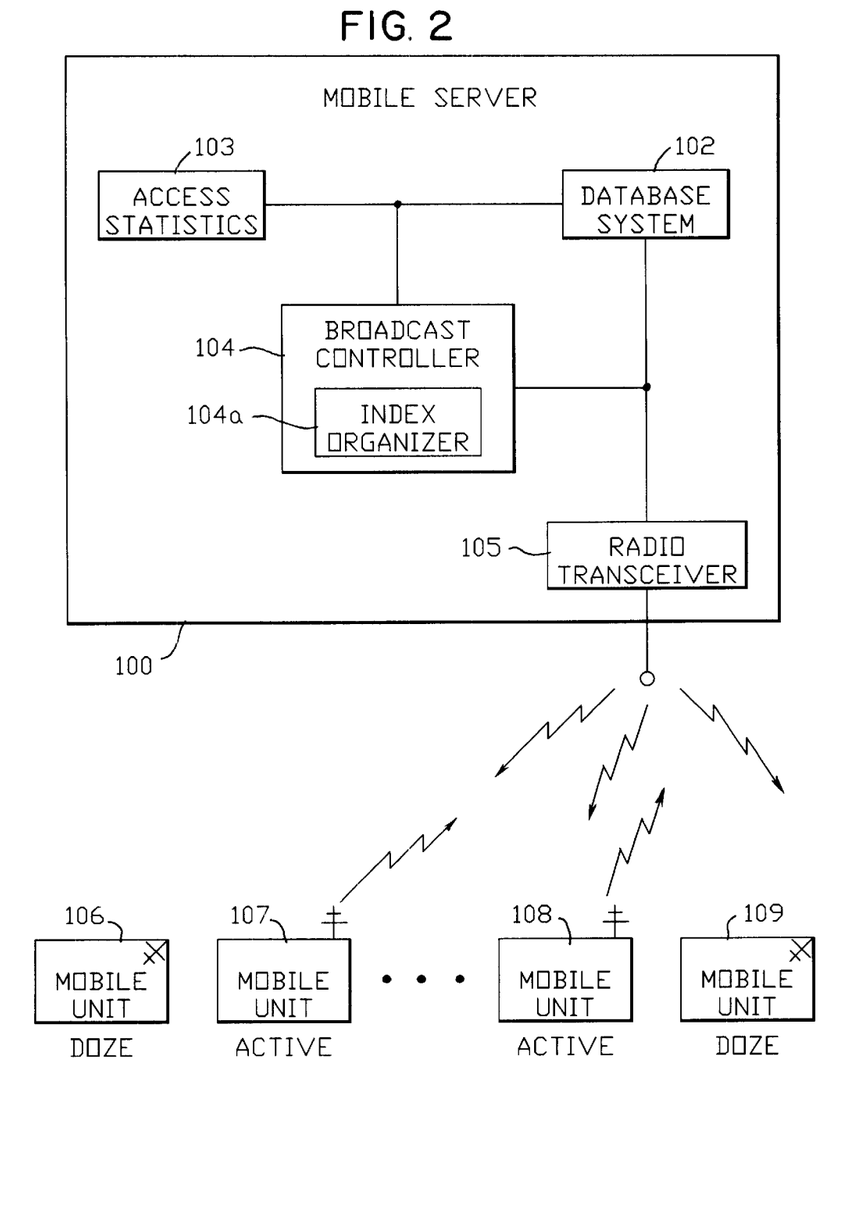
FIG. 2 illustrates a wireless mobile computing environment including a mobil server which broadcasts data in accordance with an embodiment of the present invention.

FIG. 2 shows a wireless mobile computing system in accordance with an embodiment of the present invention. A mobile server 100 includes a database system 102 (which includes a collection of data records to be broadcast and data processing logic for maintaining and accessing the data records), data access statistics 103 (which can be stored, for example, in semiconductor or disk memory), and a broadcasting controller 104. The broadcasting controller 104 includes an index organizer 104a which utilizes the access statistics 103 to organize the data records to be retrieved from the database 102 for broadcasting. The index organizer can be embodied as program code in accordance with FIGS. 3–13. The mobil server 100 broadcasts selected data records from the database by way of a radio transceiver 105. The mobile server 100 also receives messages (e.g. requests) from mobile computing units (mobil units) 106–109 by way of the radio transceiver 105. The messages are processed by the broadcast controller which, in turn, determines the access statistics 103 for the data records and stores them in the memory. The mobile units can be in doze mode, saving power consumption, such as the ones marked 106 & 109, or be in active mode, receiving data from the transceiver, such as the ones marked 107 & 108. Those of skill in the art will recognize that the mobile server will also include a number of other conventional system components, which are not the subject of the present invention.

A conventional index tree is shown in FIG. 1a, and its corresponding broadcasting sequence from the mobile server is shown in FIG. 1b. Suppose that a given record, R5, is to be accessed by a mobile unit. After being routed to the root index, I, the mobile unit will stay in the doze mode while the irrelevant information, a1, R1, R2 and R3, is being broadcasted, and go back to the active mode only when the relevant information, $a_2$ and R5, is present.

Figure 3:
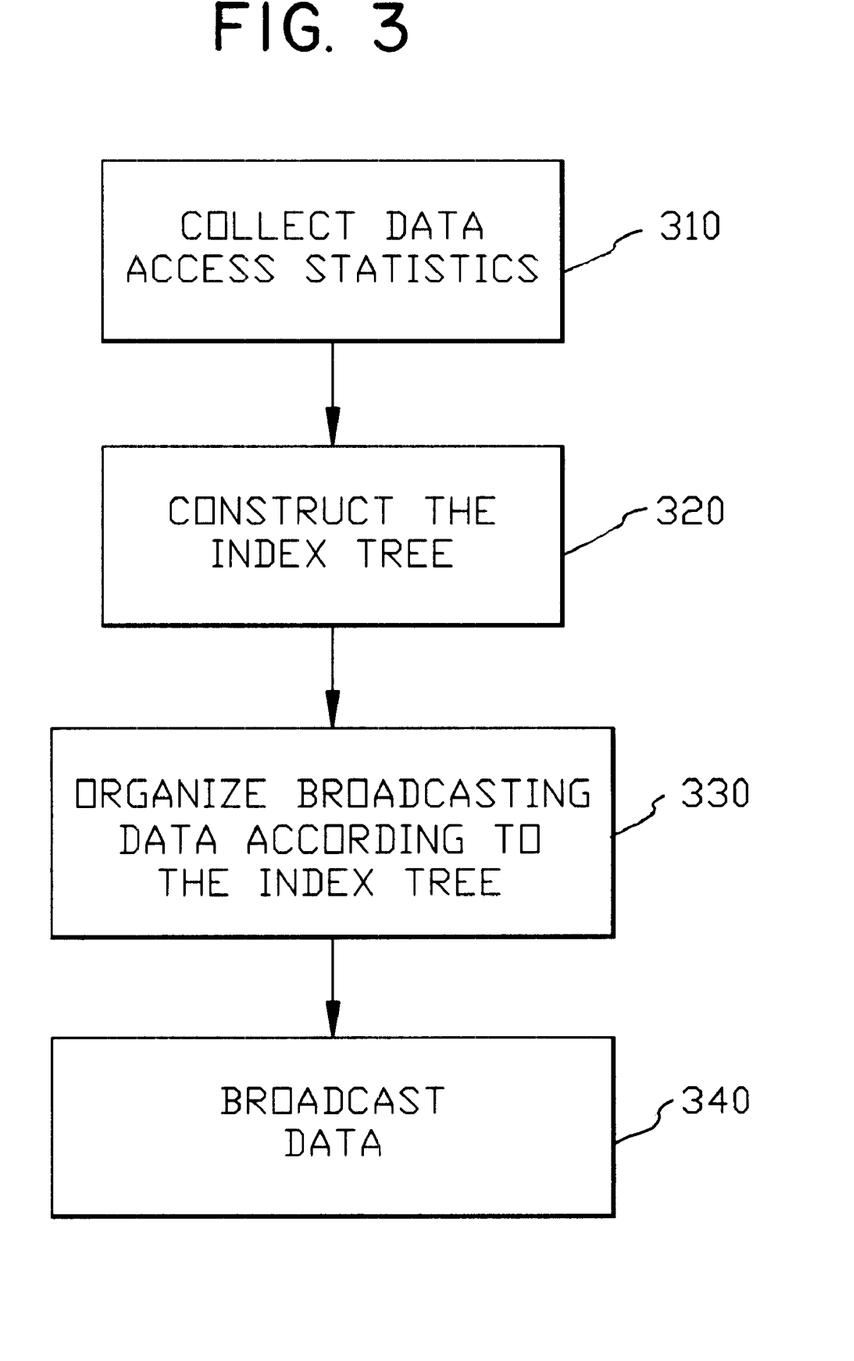
FIG. 3 shows a flowchart of the broadcast method employed in the mobile server of FIG. 3.

FIG. 3 shows a flowchart of the broadcast operation of the mobile server 100.

First, in step 310, the mobile server collects the data access frequencies. More specifically, the mobile server monitors all requests from mobile units and stores the access frequencies of all data items as the data access statistics 103 (FIG. 2). The data access statistics are stored such that every data item is paired with its access probability. The access probability is the probability that the corresponding item is accessed by an incoming request.

Next, in step 320 the statistics collected in step 310 are used to build the index tree. The method used to build the index tree can be either method 1 for a constant (fixed) fanout or method 2 for a variant fanout.

In step 330, the data is organized according to the index tree built in step 320. In particular, the data is organized such that every index node of the index tree contains all of the pointers needed to access its child nodes.

After the data has been organized, in step 340 the database is broadcast according to the index tree such that nodes in higher levels (closer to the top of the tree) are broadcast earlier than those in lower levels.

Figure 11:
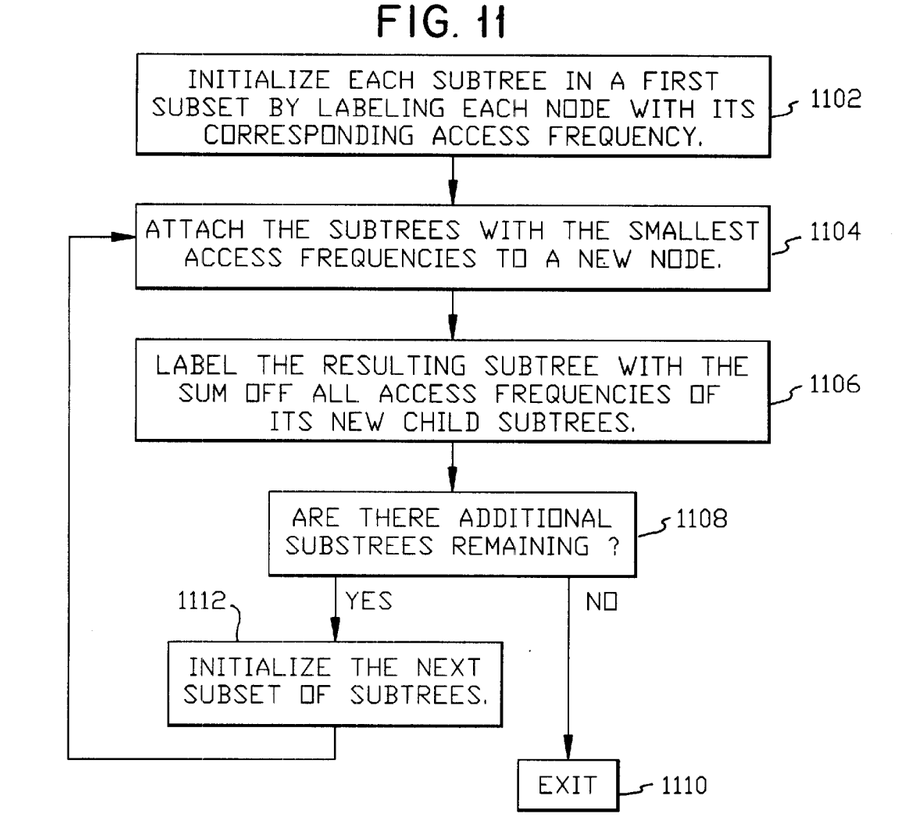
FIG. 11 is a flow chart of a fixed fanout method for constructing an index tree according to an embodiment of the present invention; and, FIG. 12 is a flow chart of the variable fanout method for constructing an index tree according to an embodiment of the present invention.

Method 1, which handles a constant fanout, will now be described in more detail by reference to FIG. 11. In essence, the method reduces the number of index probes for hot (i.e., frequently accessed) data while allowing more probes for cold (less frequently accessed) data. In the preferred embodiment, this method is implemented by way of program instructions executing on a general purpose computer.

In the description below, n is the number of total data records and d is the fanout of each index. The number of data records is denoted as n, and each data record is denoted as $R_i$, where $1 \leq i \leq n$. Let $Pr(R_i)$ be the access probability of $R_i$, i.e., the sum of all $Pr(R_i)$ for $1 \leq i \leq n$. Also, $a_i$ is used to represent an index node in an index tree and $d(a_i)$ represents the fanout of $a_i$. $Path(R_i)$ is the set of index nodes from the root to data record $R_i$. Referring to FIG. 1a, as an example, $d(a_1)=3$ signifying that node a1 has a fanout of three records (R1, R2 and R3). $Path(R_3)=\{I, a_1\}$ in FIG. 1a signifying that the path to get to record R3, traverses the index node (I) and then node a1.

Method 1 uses the access frequencies to build an index tree with a fixed fanout d. In step 1102 the method initializes a forest of n subtrees, each of which is a single node labeled with the corresponding access frequency. Next, in step 1104 the d subtrees with the smallest labels are attached to a new node and the resulting subtree is labeled with the sum of all labels from its d child subtrees. n is then decremented by the fixed fanout d and the result is increased by 1(n=(n-d)+1). Then, n is the number of remaining subtrees. In step 1108 it is determined if there are additional substrees remaining (n>1). If so, the method exits in step 110. Otherwise the next set of subtrees is initialized in step 112 and the method is repeated from step 1104.

Figure 4A:
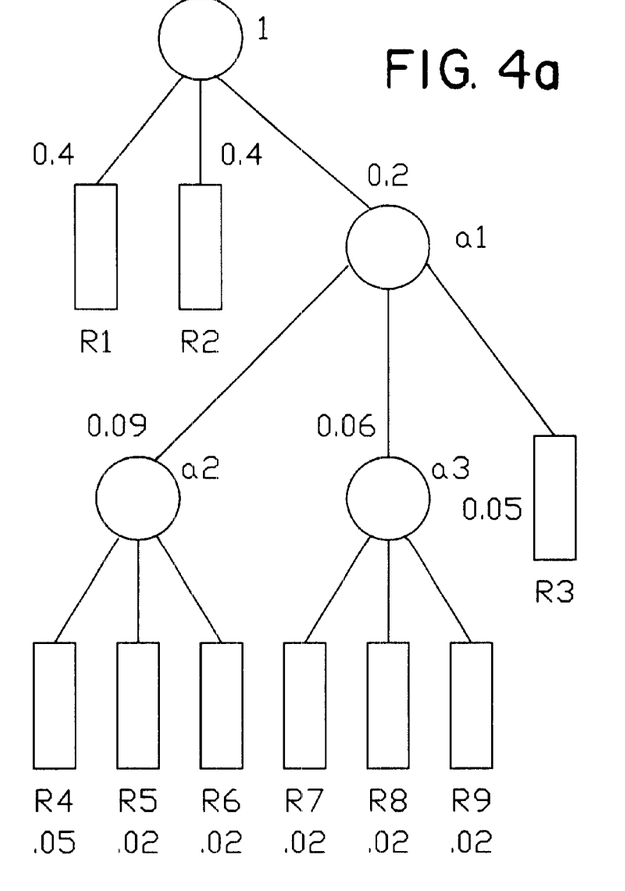
FIG. 4a illustrates an imbalanced index tree constructed in accordance with an embodiment of the present invention.
Figure 9:
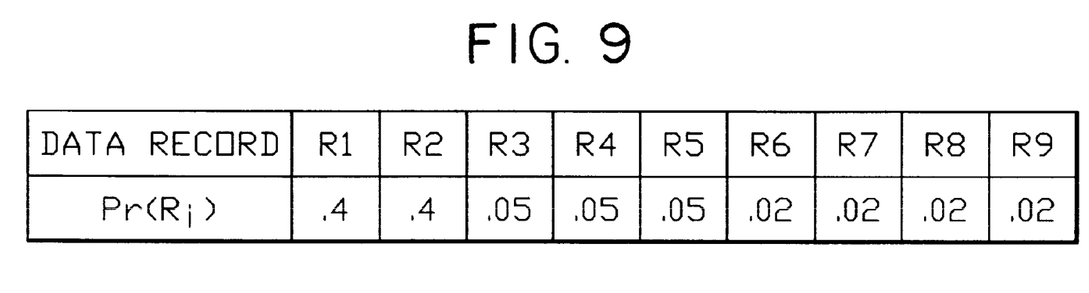
FIG. 9 shows the access probability for each data record in an example database.

For example, given the profile in FIG. 9 and d=3, method 1 will build an imbalanced index tree in a bottom up manner and lead to an imbalanced index tree with a fanout of three (designated as $T^I_{d=3}$) as shown in FIG. 4a. To facilitate our presentation, the index tree in FIG. 1a is denoted by $T^B_{d=3}$. The superindexes of $T^B_{d=3}$ and $T^I_{d=3}$ stand for "balanced" and "imbalanced", respectively. Denote the cost of probing an index $a_i$ as $f(a_i)$. Then, the average cost of locating a record by probing indexes can be expressed as:

$$\Sigma_{1 \leq i \leq n} Pr(R_i) \Sigma_{a_j \in Path(R_i)} f(a_j)$$

where $Path(R_i)$ is the set of index nodes from the root to data record $R_i$.

Figure 4B:
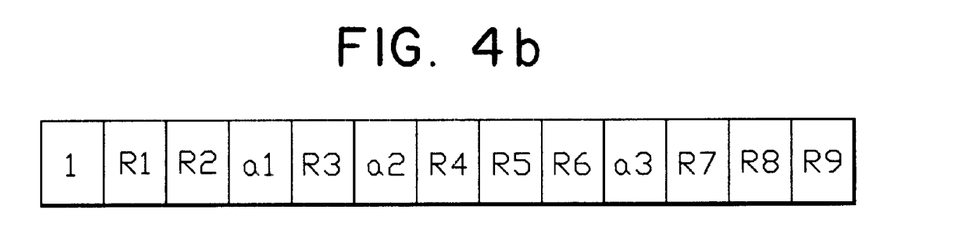

Without loss of generality $f(a_i)=g(d(a_i))=d(a_i)$ is used in our discussion. It can be verified from FIG. 9 that by using the imbalanced index tree $T^I_{d=3}$, instead of $T^B_{d=3}$, the average cost of an index probe for data access can be significantly reduced, thus reducing the average power consumption. A corresponding broadcasting sequence is shown in FIG. 4b. Consequently, given a fixed index fanout, the average cost of index probes is minimized by using the index tree constructed by method 1.

Next, method 2, which uses variant index fanouts to minimize the average cost of index probes is described. It is noted that unlike the conventional file system where a simple data structure is usually preferable, the approach of using variant index fanouts can be implemented in the indexed broadcasting environment to lead to performance improvement.

It is observed that on one hand, we want data records to stay as close to the root as possible, which, on its own, suggests that all data records be attached to the root node. On the other hand, however, indexes with larger fanouts are in general more costly to probe, and thus undesirable, particularly for those data records with high access frequencies. Method 2 strikes a compromise between these conflicting factors and minimizes the average cost of index probes.

In the preferred embodiment, method 2 is greedy in nature and builds the index tree in a top down manner. Method 2 starts with attaching all data records to the root node. Then, after some evaluation, the method groups nodes with small access frequencies and moves them to one level lower so as to minimize the average index probe cost.

Figure 5:
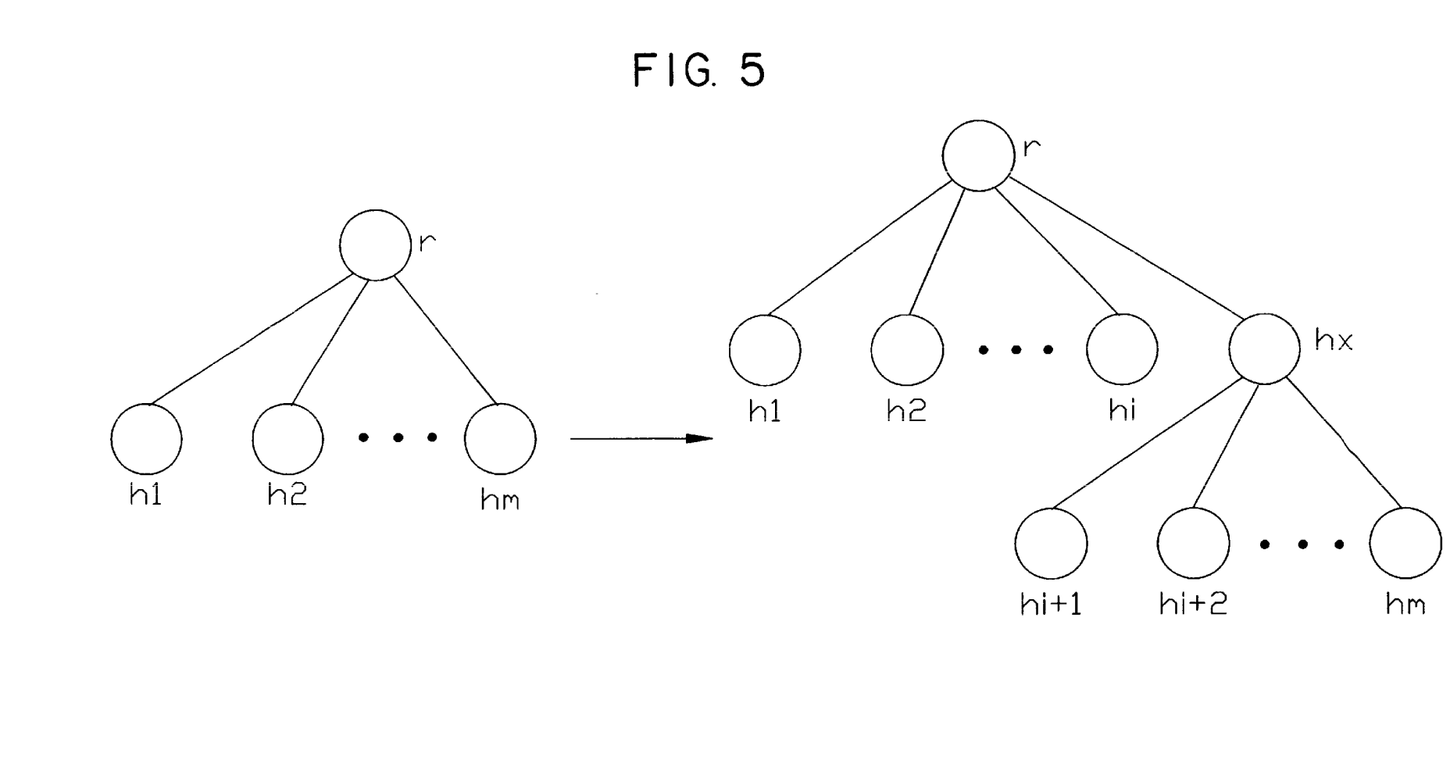
FIG. 5 shows the process of grouping a set of nodes and moving them to a lower level to reduce the average index probe cost in accordance with an embodiment of the present invention.

FIG. 5 shows the scenario of grouping a set of nodes and moving them to a lower level. It can be seen from FIG. 5 that while the cost of index probes is increased for those nodes moved down to the next level (i.e., the index probe cost for each node among $h_{i+1}, h_{i+2}, \ldots,$ and $h_m$ is increased from m to (i+1)+(m−i)=m+1), the index probe cost for the other nodes will be greatly reduced (i.e., the index probe cost for each node among $h_1, h_2, \ldots,$ and $h_i$ is reduced from m to i+1), thereby resulting in an overall reduction on the average index probe cost. Method 2 contains a recursive procedure Partition to identify the group of nodes to be moved downward in each execution level.

Figure 12:
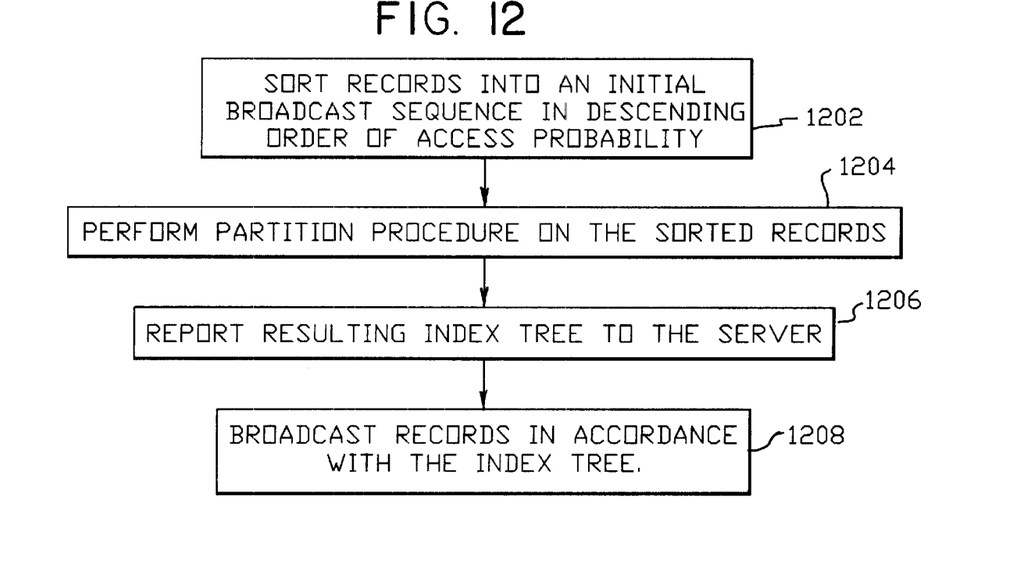

A flow diagram of method 2 is shown in FIG. 12.

First, in step 1202 the records $(R_1, R_2, \ldots, R_n)$ are sorted into an initial broadcast sequence according to descending order of access probability, $Pr(R_j)$, where $1 \leq j \leq n$. At the conclusion of the sorting the sequence will be organized such that $Pr(R_j) \geq Pr(R_k)$ if and only if j<k.

Next, in step 1204 the Partition procedure is performed, Partition $(R_1, R_2, \ldots, R_n)$.

Then, in step 1206 the resulting index tree is reported to the server. When the next broadcast in the periodic broadcast cycle is commenced, in step 1208 the records are broadcast in the order indicated by the index.

Figure 13:
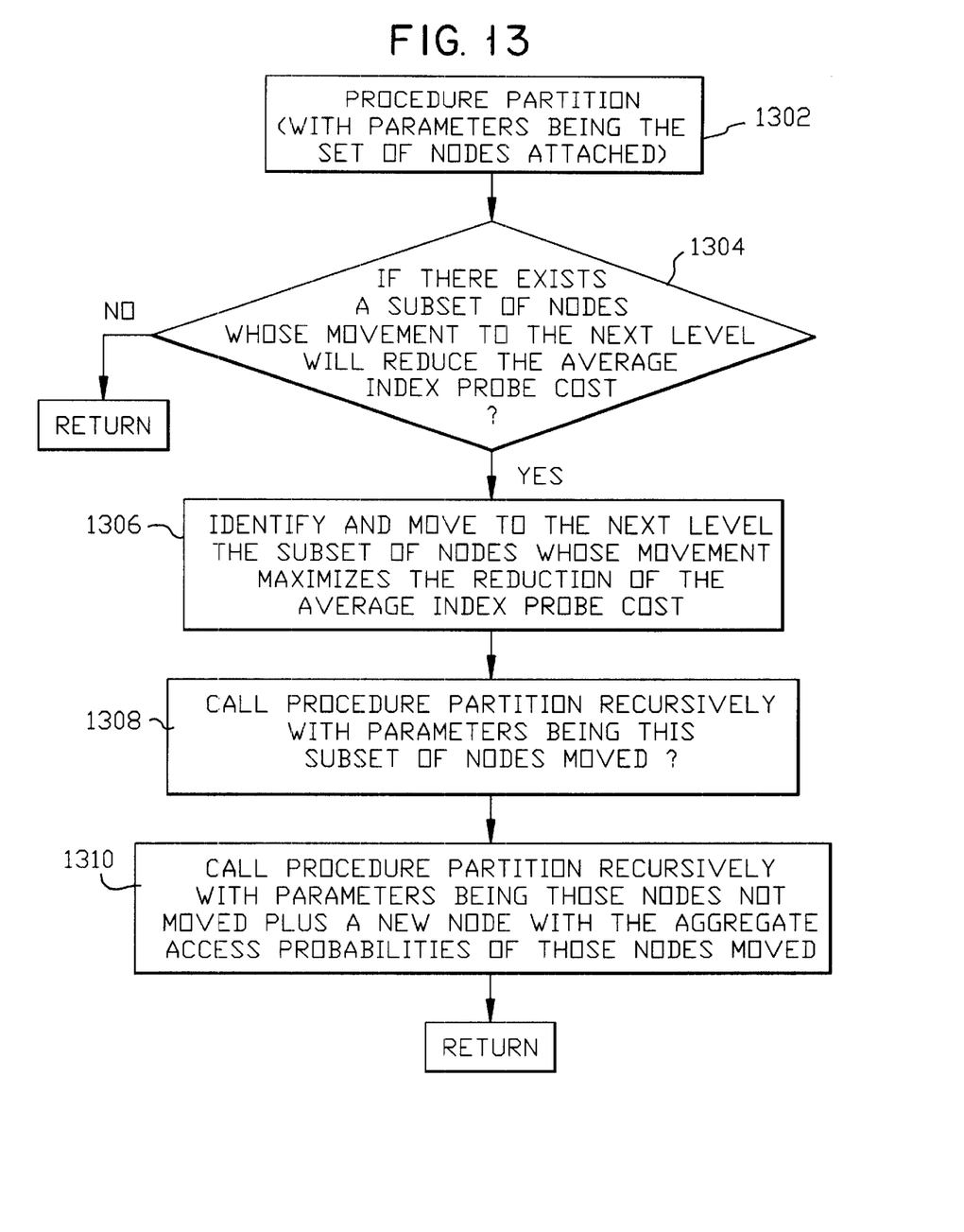
FIG. 13 is a flow chart of the Partition procedure of FIG. 12.

The Partition procedure, shown in more detail in FIG. 13. In step 1302 the procedure starts with a configuration where all nodes are attached to the root. In step 1304 it is determined if the average index probe cost can be reduced by moving a set of nodes to the next level.

In step 1306 the specific set of nodes whose movement would be beneficial are identified and moved to the next lower level of the index tree (further from the index node). If more than one set of nodes is identified (i.e. if there is more than one candidate set of nodes whose movements would be beneficial) the one with the maximal reduction on the index probe cost is chosen and moved.

After the initial set of nodes has identified and moved to the next level, in step 1308 the Partition procedure is called recursively to evaluate each of the nodes by themselves to see if any further downward movement for some of them is necessary.

In step 1310 procedure Partition is called again to see if any further downward movement for some nodes in the new list is necessary. This recursive call of the Partition procedure operates on the original level by replacing those nodes moved downward with a new index node (e.g., $h_x$ in FIG. 5) and assigning that node with an access frequency equal to the aggregate frequency of its child nodes, Procedure Partition partitions the nodes recursively with the objective of minimizing the average index probe cost. The index tree is then constructed in a top down manner.

To described the partitioning method in more detail, in step 1302 the Partition procedure is called for a tree of nodes (h1, h2, . . . , hm). In step 1304, let $y(i)=(m-i-1)\Sigma_{1 \leq j \leq i} Pr(h_j) - \Sigma_{i+1 \leq j \leq m} Pr(hj)$. Determine i* such that $y(i^*)= \max_{\forall i \in \{i, m \cdot 2\}}\{y(i)\}$. If $y(i^*) \leq 0$ then return. Then, in step 1306, attach nodes hi*+1, hi*+2, . . . , hm under a new index node hx in the index tree. In step 1308 recursively call the Partition procedure for the restructured tree (hi*+1, hi*+2, . . . , hm).

In step 1310, insert hx into the ordered list (h1, h2, . . . , hi*) and relabel them as (h1, h2, . . . , hi*+1) according to descending order of Pr(hj), $1 \leq j \leq i^*+1$. The again recursively call the Partition procedure for the restructure tree (h1, h2, hi*+1). Then return to the calling program in step 1312.

Figure 6A:
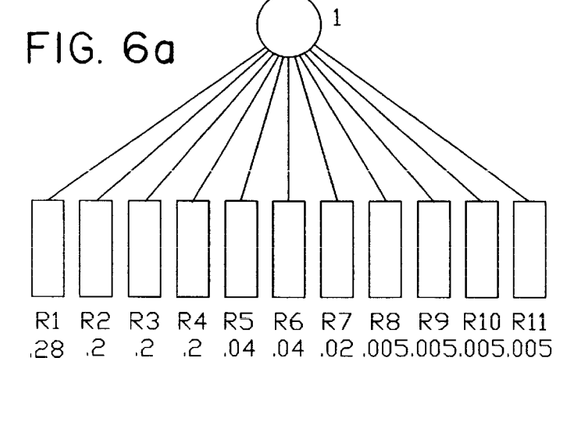
FIGS. 6a–6d show an illustrative example for a variant fanout method (VF) according to an embodiment of the present invention.
Figure 6B:
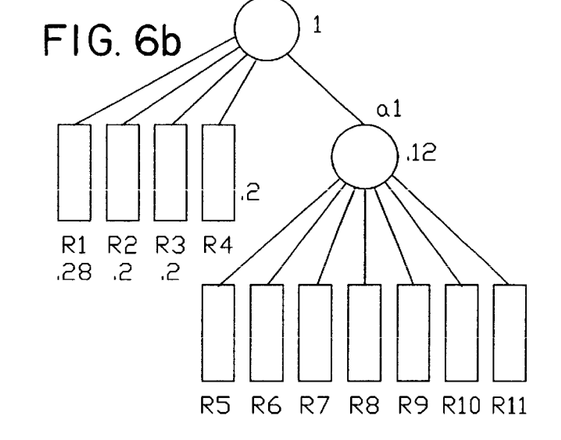
Figure 6C:
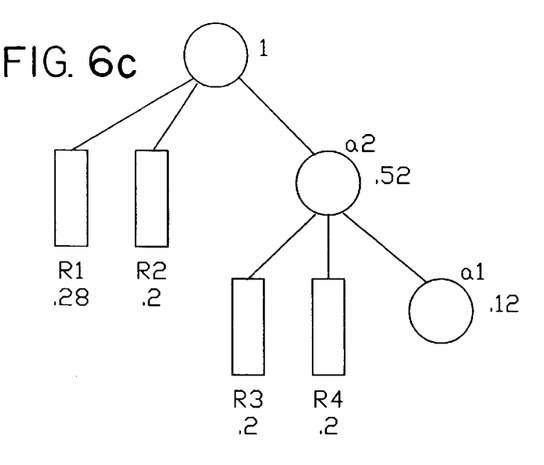
Figure 6D:
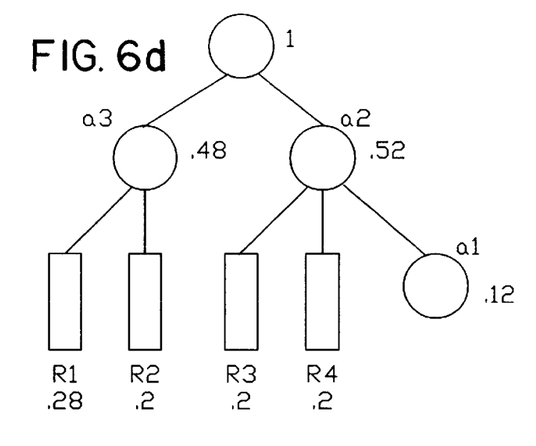
Figure 7:
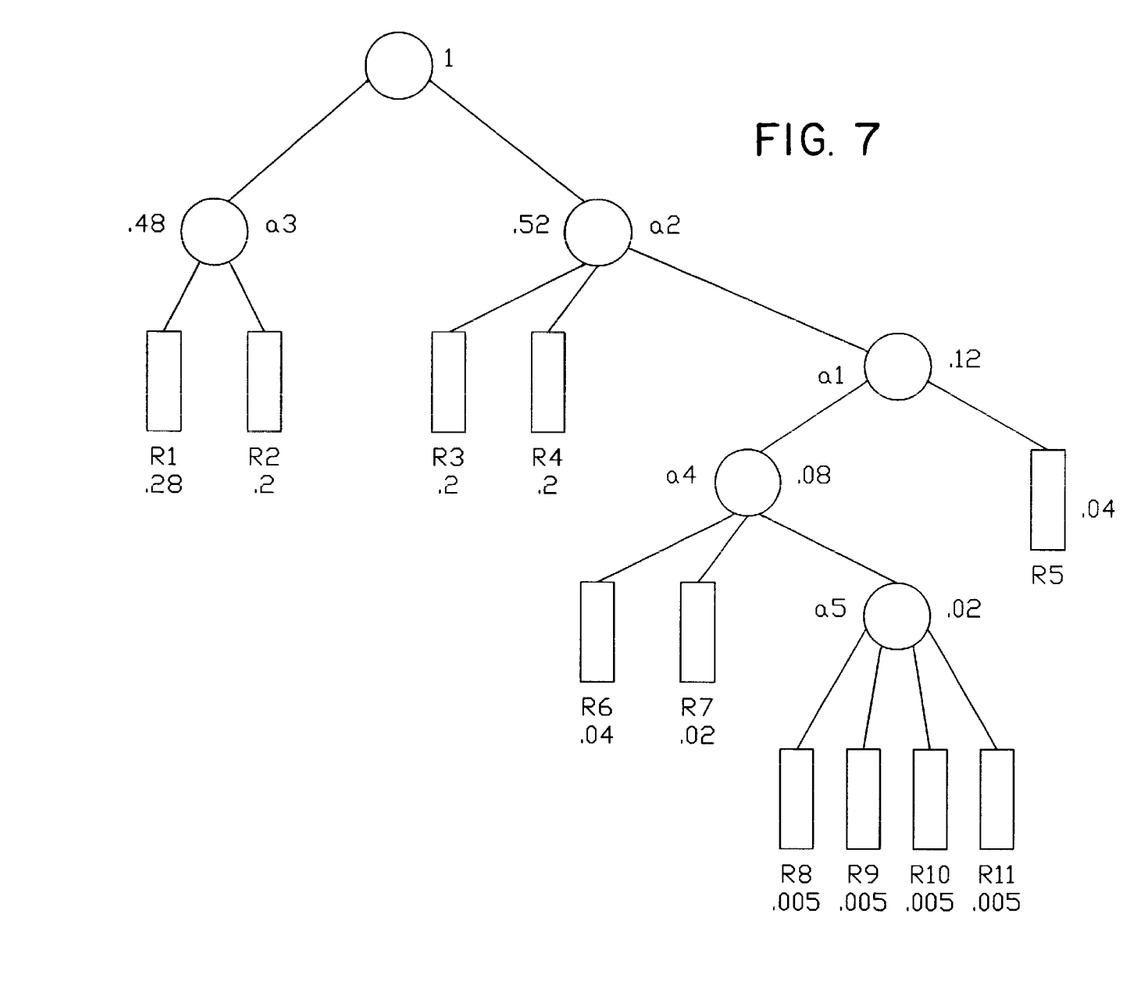
FIG. 7 shows a resulting index tree with variant fanouts from the variant fanout method of FIG. 6.
Figure 10:
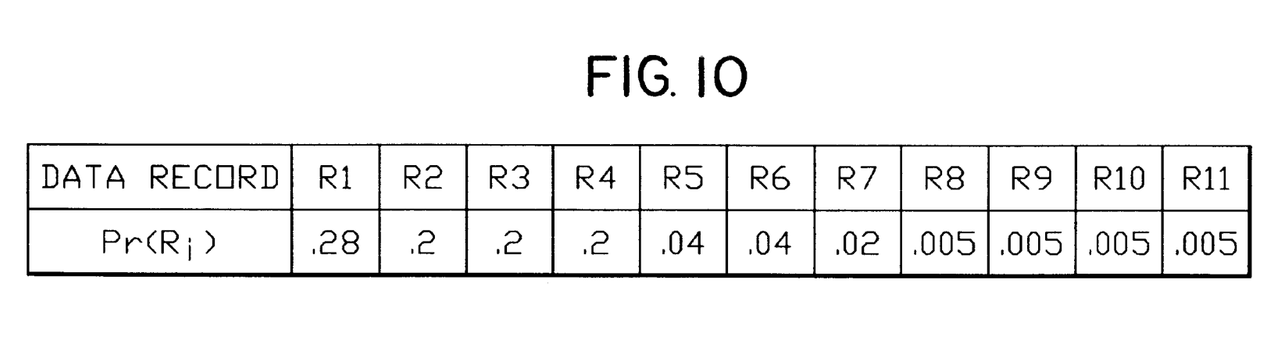
FIG. 10 shows the access probability for each data record in another example database.

Use the data profile in FIG. 10 for an example. The initial index tree configuration in shown in FIG. 6a, where all data records are attached to the root. Procedure Partition then determines the optimal group of nodes to be moved to the next level. It is obtained that i*=4, and therefore group nodes R5, R6, . . . , and R11 together and move them to the next level, resulting in the configuration shown in FIG. 6b. Nodes R5, R6, . . . , and R11 under the index node a1 are then partitioned recursively. Also, in the original level, nodes R5, R6, . . . , and R11 are now replaced with a1 which is assigned with an access frequency of 0.12. It next determines if a further partition for the new list of child nodes under the root (i.e., R1, R2, R3, R4 and a1) is necessary. Consequently, the resulting index tree is shown in FIG. 7.

Figure 8:
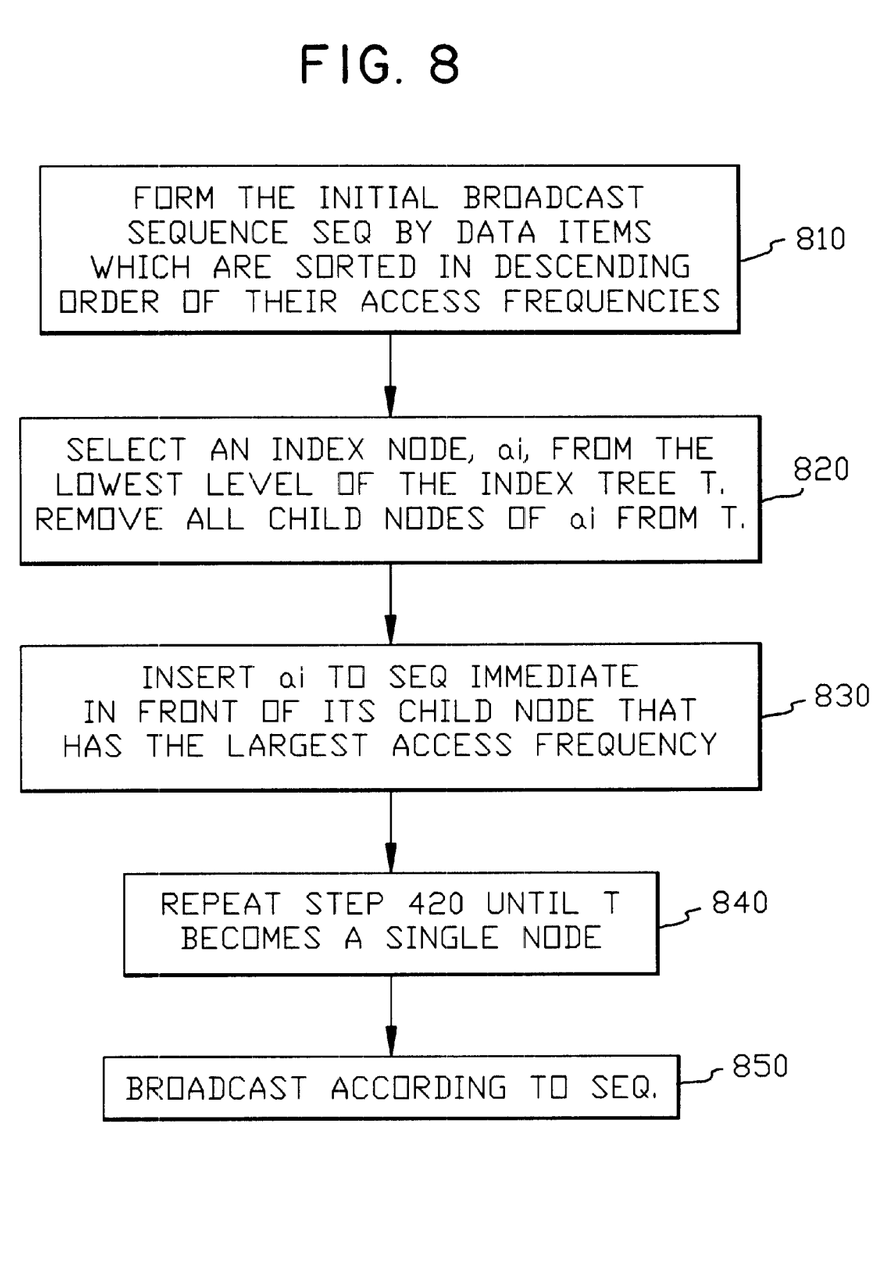
FIG. 8 is a flowchart of how the data in the database is broadcast by the mobil server of FIG. 2.

FIG. 8 is a flowchart showing, with a given index tree, how the data in the database in broadcast. In step 810 the initial broadcasting sequence SEQ is formed by data items sorted in descending order of their access probabilities, i.e. SEQ=(R1, R2, . . . Rn), where $Pr(Rj) \geq Pr(Rk)$. Step 820 selects an index node, say $a_i$ from the lowest level of the index tree T and removes the child nodes of a1 from T (i.e. a1 this becomes a leave node). In step 830 ai is inserted in SEQ and placed immediately in front of its child node with the largest access probability. Then, in step 840, steps 820–830 are repeated until T becomes a single node. In step 850 the data is broadcasted.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. A method for broadcasting data records and indexes from a mobile server, comprising the steps of:

determining access frequencies of at least a subset of the data records;

building an index tree having index nodes with child nodes comprising at least one of a further index node and a data record, by:

(a) attaching the subset of data records to a root node of the index tree; and (b) recursively identifying at least one group of nodes with small access frequencies and moving the at least one group downward to a lower level in the tree;

dynamically determining a broadcast order of the data records based on changes in the structure of the index tree; and broadcasting the data records and the indexes based on the broadcast order.

2. The method of claim 1, wherein access to a data record is associated with a number of index probes, and the number of index probes for a data record with a higher access frequency is less than the number of index probes for a data record with a lower access frequency.

3. The method of claim 1, wherein each index node contains pointers for accessing all of its child nodes.

4. The method of claim 1, further comprising the step of, after building the index tree, reporting the index tree to the mobile server.

5. The method of claim 1, wherein the mobile server monitors requests for data records from mobile units.

6. The method of claim 1, wherein the mobile server stores data records with corresponding access frequencies.

7. The method of claim 1, wherein the number of child nodes per index node is fixed.

8. The method of claim 1, wherein the index tree is imbalanced.

9. A method for broadcasting data records and indexes from a mobile server, comprising the steps of:

determining access frequencies of at least a subset of the data records;

building an index tree with a variant fanout comprising nodes of one of indexes and data records based on the access frequencies of the data records, by:
  (a) attaching the set of data records to a root node of the index tree; and
  (b) recursively identifying at least one group of nodes with small access frequencies and moving the at least one group downward to a lower level in the tree;

dynamically determining a broadcast order of the data records based on changes in the structure of the index tree; and broadcasting the data records and the indexes based on the broadcast order.

10. The method of claim 9, wherein the number of fanouts from each index node is determined as a function of the access frequencies of the nodes to which the index node points.

11. The method of claim 9, wherein the step of building the index tree further comprises the step of determining whether an average index probe cost can be reduced by moving a set of nodes to a lower level in the tree.

12. The method of claim 9, wherein the step of building the index tree further comprises the step of, after moving at least one group of nodes downward to a lower level:

replacing the at least one group of nodes with a new index node; and assigning the new index node with an access frequency equal to an aggregate frequency of the child nodes of the new index node.

13. The method of claim 9, further comprising the step of, after building the index tree, reporting the index tree to the mobile server.

14. A mobile computing broadcast server system, comprising:

means for determining access frequencies of at least a subset of data records;

means for building an index tree having index nodes with child nodes comprising at least one of a further index node and a data record, wherein the index tree is built by:
  (a) attaching the subset of data records to a root node of the index tree; and
  (b) recursively identifying at least one group of nodes with small access frequencies and moving the at least one group downward to a lower level in the tree;

means for dynamically determining a broadcast order of the data records based on changes in the structure of the index tree; and means for broadcasting the data records and the indexes in the broadcast order.

* * * * *